United States Patent
Gollwitzer

(10) Patent No.: US 7,926,077 B2
(45) Date of Patent: Apr. 12, 2011

(54) AUDIO AND/OR VIDEO SYSTEM FOR A MOTOR VEHICLE

(75) Inventor: Hermann Gollwitzer, Hausham (DE)

(73) Assignee: Siemens Aktiengesellschaft, München (DE)

( * ) Notice: Subject to any disclaimer, the term of this patent is extended or adjusted under 35 U.S.C. 154(b) by 584 days.

(21) Appl. No.: 10/583,498

(22) PCT Filed: Nov. 12, 2004

(86) PCT No.: PCT/EP2004/052948
§ 371 (c)(1),
(2), (4) Date: Jun. 16, 2006

(87) PCT Pub. No.: WO2005/062534
PCT Pub. Date: Jul. 7, 2005

(65) Prior Publication Data
US 2007/0061846 A1 Mar. 15, 2007

(30) Foreign Application Priority Data
Dec. 19, 2003 (DE) .................. 103 60 017

(51) Int. Cl.
*H04N 7/18* (2006.01)
*H04L 12/28* (2006.01)

(52) U.S. Cl. .......................... 725/75; 370/406
(58) Field of Classification Search ............ 725/75
See application file for complete search history.

(56) References Cited

U.S. PATENT DOCUMENTS

| | | | |
|---|---|---|---|
| 5,794,164 A * | 8/1998 | Beckert et al. | 455/3.06 |
| 6,052,555 A * | 4/2000 | Ferguson | 725/116 |
| 6,441,955 B1 * | 8/2002 | Takatsu et al. | 359/341.4 |
| 6,765,916 B1 | 7/2004 | Duvvuru et al. | |
| 6,785,472 B1 * | 8/2004 | Adams et al. | 398/79 |
| 7,181,511 B1 * | 2/2007 | Grenier et al. | 709/223 |
| 2001/0025376 A1 * | 9/2001 | Knobl | 725/74 |
| 2002/0158879 A1 * | 10/2002 | Broghammer et al. | 345/555 |
| 2003/0002100 A1 * | 1/2003 | Izadpanah | 359/124 |
| 2003/0059160 A1 * | 3/2003 | Rikitake et al. | 385/24 |
| 2004/0105676 A1 * | 6/2004 | Norizuki et al. | 398/68 |

FOREIGN PATENT DOCUMENTS

| | | |
|---|---|---|
| DE | 199 45 840 | 4/2001 |
| DE | 199 44 967 | 5/2001 |
| DE | 199 63 155 | 6/2001 |
| WO | WO 02/063831 | 8/2002 |

OTHER PUBLICATIONS

European Search Report dated Aug. 24, 2007 issued in a corresponding foreign application. R. Gardner, et al., High Performance Photonic Avionics Networking Using WDM, IEEE Military Communication Conference Milcom, Bd. 2, Oct. 31, 1999, pp. 958-962.

* cited by examiner

*Primary Examiner* — Brian T Pendleton
*Assistant Examiner* — Jean D Saint Cyr
(74) *Attorney, Agent, or Firm* — Cohen Pontani Lieberman & Pavane LLP

(57) ABSTRACT

The invention relates to an audio and/or video system for a motor vehicle, which comprises an annular, bi-directional, optical network (1) from optical waveguides and audio and/or video devices (2-12) that are interlinked by means of the network (1) in an annular manner. Data are transmitted between the audio and/or video devices (2-12) in the network (1) in a first data channel having a first optical wavelength. The network used is especially a MOST bus known for use in motor vehicles. The invention is characterized in that data are transmitted between the audio and/or video devices (2-12) in the network (1) in a second data channel having a second optical wavelength. Particularly, IP data can be transmitted at a high transmission rate via the second data channel.

5 Claims, 1 Drawing Sheet

AUDIO AND/OR VIDEO SYSTEM FOR A MOTOR VEHICLE

CROSS REFERENCE TO RELATED APPLICATIONS

This is a U.S. national stage of application No. PCT/EP2004/052948, filed on 12 Nov. 2004. Priority is claimed on the following application(s): Country: Germany, Application No.: 103 60 017.5, Filed: 19 Dec. 2003 the content of which is/are incorporated here by reference.

BACKGROUND OF THE INVENTION

The invention relates to an audio and/or video system for a motor vehicle having a ring-shaped, bidirectional, optical network comprising optical fibers and audio and/or video appliances which are connected to one another in a ring shape by means of the network, where data are transmitted between the audio and/or video appliances in the network in a first data channel having a first optical wavelength. An audio and/or video system (A/V system) of this kind is known from U.S. Patent Application Publication No. 2001/025376.

Different audio and/or video appliances (A/V appliances) are in use in motor vehicles. Often, these are single appliances which are not connected to one another and are therefore controlled separately. In some cases, although the appliances are connected to one another, only particular appliances from a particular manufacturer can usually be connected to one another, which means that the user is severely restricted when expanding the system. In addition, A/V systems are also known in which the individual A/V appliances are connected to one another by a ring-shaped optical network. Particular mention should be made in this context of an optical network based on the MOST (Media Oriented Systems Transport) standard for use in motor vehicles. A MOST bus can be used to transmit data at a transmission rate of 22.5 Mbit/s. The progressive use of multi-media applications in motor vehicles means that the classical MOST bus gives rise to more and more bandwidth problems, however, that is to say that the transmission rate is inadequate for some applications, such as transmitting video data or music data. Thus, at the present time, the "IP over MOST" protocol is being used to transmit IP (Internet Procotol) data, for example, with corresponding bandwidth limitations. To eliminate such limitations, it would be inherently advisable to replace the MOST bus used in vehicles with a bus having a higher transmission rate. A drawback in this context, however, is that a new bus is not readily compatible with existing controllers, which means that beside the MOST bus for existing A/V appliances a further bus would be required for A/V appliances with high transmission rates. A solution of this kind is barely feasible from the cost aspect, however.

SUMMARY OF THE INVENTION

It is therefore an object of the invention to develop an audio and/or video system such that by largely retaining the existing ring-shaped optical network it is both possible to operate appliances based on a conventional standard, such as MOST, in particular, but at the same time more effective data transmission is ensured for appliances with a high data throughput.

The object is met by an audio and/or video system having a ring-shaped, bidirectional optical network with optical fibers and audio/visual (A/V) appliances connected to the network. The A/V appliances include at least one receiver or player and at least one output unit. Data are transmitted between the A/V appliances in the network on a first data channel having a first optical wavelength. Data are also transmitted between A/V appliances in the network on a second channel having a second optical wavelength, the A/V appliances having optical couplers with filters for separating the first and second data channels.

The first data channel is used to implement the inherently known MOST network, in particular. A fundamental feature of MOST technology is optical data transmission using plastic optical fibers in a ring topology with a bandwidth of 22.5 Mbit/s. Both control commands and status information are transmitted. In addition, it is possible to transmit both data streams, for example for conventional audio and video applications, and data packets for graphics or navigation.

In contrast, data transmission can take place at a higher transmission rate using the second data channel. In this case, the second data channel can be used to produce an "Ethernet", in particular. Ethernet is a network variant which is known from computer technology and which has a higher transmission rate than the MOST bus used in vehicles. The Ethernet is then used to transmit data particularly on the basis of the Internet Protocol (IP). The inventive implementation of a second data channel having a second optical wavelength for transmitting data therefore allows the existing optical fiber network, that is to say the same optical fiber, to be used to transmit data in a motor vehicle on the basis of different standards.

The two data channels are produced by resorting to "wavelength division multiplexing" (WDM). WDM is an optical fiber multiplexing technique which is known in principle for telephone networks and which results in better utilization of the optical fiber capacity. With the WDM technique, different wavelengths of light are used for transmitting a plurality of signals in parallel. In terms of wavelengths, the optical windows at 850 nm, 1300 nm and 1550 nm can be used for transmission. In practice, the optical window at the wavelength of 1550 nm is normally used. Within this optical window, wavelengths which are separated from one another by only approximately 3 nanometers, for example, are used for the individual channels. By way of example, it is thus possible to use a wavelength of 1548 nm for data transmission on the first data channel and a wavelength of 1551 nm for data transmission on the second data channel. The data channels are separated by optical filters. U.S. Pat. No. 6,785,472 discloses an optical ring network with an 80-km ring for a telephone network. The dimensions of motor vehicle networks are contrastingly significantly below these dimensions.

Each signal to be transmitted is modulated onto one of the light wavelengths. The number of signals which can be transmitted at the same time is therefore dependent on the number of discrete light wavelengths. An optical coupler focuses the various light wavelengths and transmits the entire light flux via the optical fiber. The data channels are separated at extraction points (nodes), at which the A/V appliances are connected to the ring network, by appropriate narrowband optical filters. The signal filtered out is then supplied to the A/V appliance, possibly after appropriate conditioning or conversion into an electrical signal.

DETAILED DESCRIPTION OF THE PREFERRED EMBODIMENTS

Figure 1:
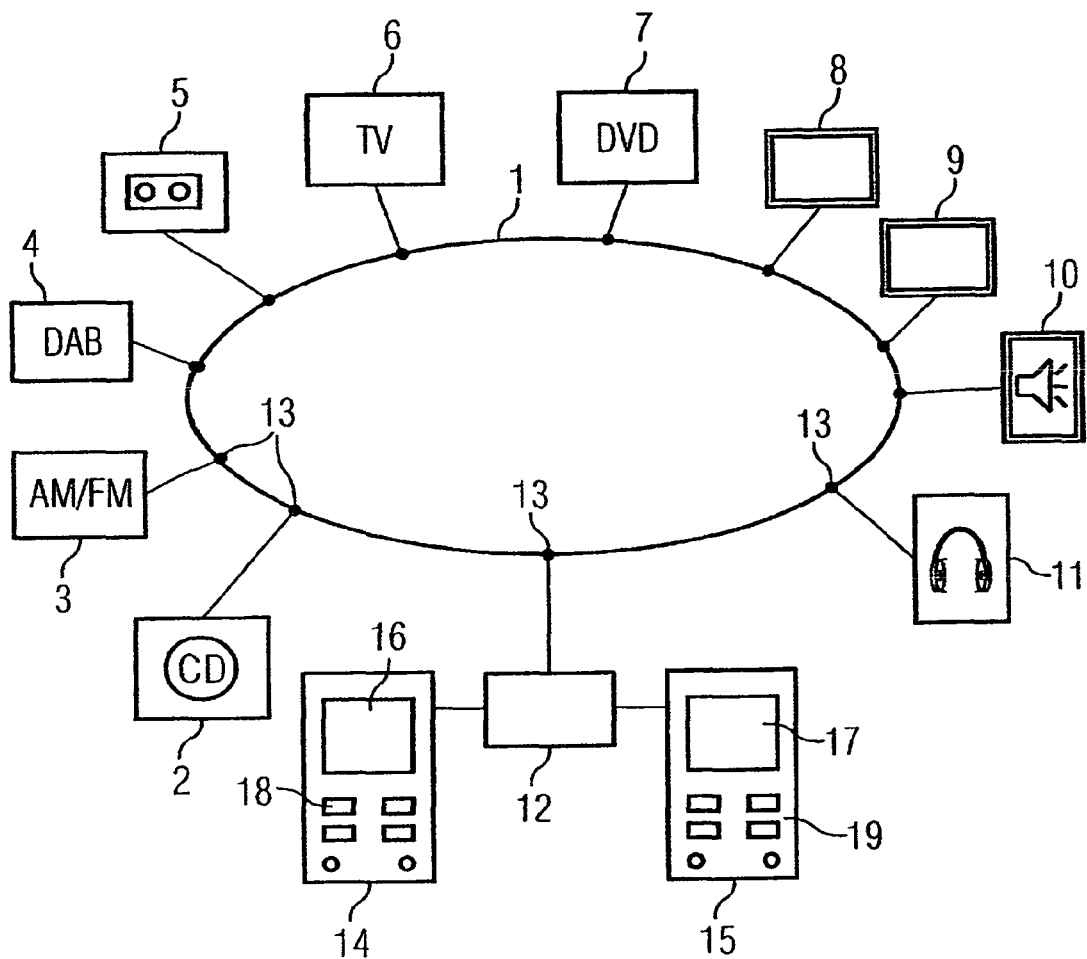
FIG. 1 is a schematic diagram showing an A/V system with a ring-shaped network structure.

FIG. 1 shows the structure of an A/V system. A ring-shaped optical network 1 connects a plurality of A/V appliances 2-12 of different kinds, including receivers, players, output units and a control unit 12, to nodes 13 in the optical network 1 and hence connects them to one another. The optical network 1 contains a media data network which allows data streams to be routed. In addition, the network 1 contains a control bus for sending commands to the nodes 13 in the network 1. The network is an optical network for motor vehicles which is known from MOST technology. The ring structure has the advantage that all data which are transmitted in the network are available, in principle, to any connected A/V appliance. In addition, the ring system is easy to extend by adding a new component to the ring.

Figure 2:
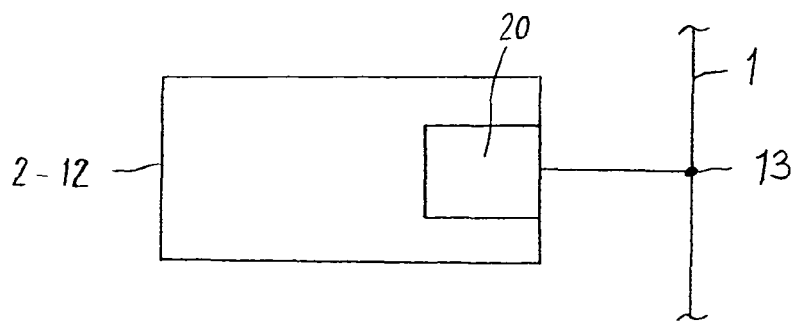
FIG. 2 shows a generic A/V appliance of the system of FIG. 1.

The receivers and players provided in the exemplary embodiment are, specifically, a CD changer 2, an analog broadcast radio receiver 3, a DAB receiver 4 for digital broadcast radio reception, a cassette player 5, a TV receiver 6 and a DVD player 7. The output units provided are two monitors 8, 9, a loudspeaker system 10 and a set of headphones 11, for example. The control unit 12 has two operating units 14, 15 connected to it, the operating units 14, 15 having respective displays 16,17 and key pads 18,19. The A/V appliances have couplers 20 (see FIG. 2) by means of which the signals modulated onto the light wavelength of the first or second data channel can be injected into the optical fibers for the network 1 or can be extracted from the optical fibers for the network 1. In this context, appropriate filters in the optical couplers separate the individual channels.

The use of the WDM technique therefore provides two data channels using the network 1 which is known per se. The first data channel is used to transport audio data from the broadcast radio receiver 3 or from the DAB receiver 4, for example, on a first wavelength on the basis of the MOST protocol. The data rate which is usual for Media Oriented Systems Transport (MOST) networks is sufficient for this. The second data channel is used to transmit IP data from the DVD player 7, for example, on a second light wavelength. Simultaneous transmission on the two data channels can take place either in one transmission direction or in opposite directions.

The inventive solution is compatible with MOST networks used in motor vehicles to date. Earlier or simpler A/V appliances continue to use the first data channel therein as the MOST bus. A/V appliances with large volumes of data use the second optical fiber channel for IP data on the other hand.

What is claimed is:

1. An audio/video system for a motor vehicle, comprising a ring-shaped, bidirectional, optical network including optical fibers and audio/video appliances connected to one another in a ring shape by said optical network, wherein data are transmitted between said audio/video appliances in said network in a first data channel configured as a MOST network having a first optical wavelength and in a second data channel configured as an Ethernet having a second optical wavelength, each of said audio/visual appliances having an optical coupler with filters for separating said first and second data channels, wherein said first and second data channels have different bandwidths.

2. The audio/video system of claim 1, wherein the data transmitted in said first data channels are formatted according to a first data format and data transmitted in said second data channel are formatted according to a second data format.

3. The audio/video system of claim 1, wherein the one of the first and second data channels having a larger bandwidth is used to transmit data based on an Internet protocol.

4. The audio/video system of claim 1, wherein data are transmitted in said network on further data channels having other optical wavelengths.

5. The audio/video system of claim 1, wherein the audio/video appliances are configured to communicate on a MOST network and an Ethernet.

\* \* \* \* \*